United States Patent [19]
Chigirinsky et al.

[11] 4,237,398
[45] Dec. 2, 1980

[54] STATOR CONSTRUCTION

[76] Inventors: Alexandr A. Chigirinsky, ulitsa Kuibysheva, 11, kv. 8; Vladimir G. Danko, bulvar Ivana Karkacha, 2, kv. 89; Nikolai G. Grinchenko, ulitsa Vatutina, 16/25; Ivan Y. Cheremisov, bulvar Ivana Karkacha, 2, kv. 81; Roman I. Tretevich, prospekt Kosiora, 126, kv. 61; Galina V. Penkina, prospekt Kosiora, 107, kv. 10, all of Kharkov, U.S.S.R.

[21] Appl. No.: 961,393

[22] Filed: Nov. 16, 1978

[30] Foreign Application Priority Data

Dec. 22, 1977 [SU] U.S.S.R. .............................. 2558752

[51] Int. Cl.³ .............................................. H02K 3/48
[52] U.S. Cl. .................................. 310/214; 310/179; 310/194; 310/201; 310/271
[58] Field of Search ............... 310/129, 130, 214, 215, 310/194, 179, 271, 201, 216, 254, 258, 259

[56] References Cited

U.S. PATENT DOCUMENTS

| 713,603 | 11/1902 | Churchward | 310/194 X |
| 4,068,142 | 1/1978 | Gillet | 310/214 |
| 4,117,362 | 9/1978 | Tsirkin | 310/214 |

FOREIGN PATENT DOCUMENTS

| 340024 | 5/1972 | U.S.S.R. | 310/214 |
| 613447 | 6/1978 | U.S.S.R. | 310/214 |

*Primary Examiner*—R. Skudy
*Attorney, Agent, or Firm*—Lackenbach, Lilling & Siegel

[57] ABSTRACT

According to the invention, the stator of an electrical machine comprises a slotted core and a multilayer bar winding partially received in the core slots and partially accommodated in the air gap of the electrical machine. Interposed between the bars of the multilayer bar winding are spacers whose slots accommodate brace members enveloping each of the bars of the multilayer bar winding on its opposite sides. Each of the brace members is attched to two rollers, one of which is secured in a spring clip received in an axial slot of the stator core, and the other of which is accommodated in a threaded pin received, in turn, in a hole provided in an insulating wedge member. The invention improves the maintainability of the electrical machine, making it as easy to maintain as any conventional slotted machine. The invention also improves the space factor of the electrical machine's air gap and accounts for a better fastening of the multilayer bar winding of the machine's stator.

7 Claims, 6 Drawing Figures

STATOR CONSTRUCTION

FIELD OF THE INVENTION

The present invention relates to the manufacture of electrical machinery and, more particularly, to a stator of an electrical machine.

The invention is applicable to stationary stators and rotary armatures of big electrical machines whose windings are partially received in core slots and partially accommodated in the air gap between the exciting winding and the armature core.

BACKGROUND OF THE INVENTION

A stator of an electrical machine (cf. USSR Inventor's Certificate No. 340,024, Cl. H 02 k 3/46) is known, wherein the winding is partially received in the core slots and partially comes out into the air gap. The stator core is provided with slots wherein the bars and means for fastening the bars in the radial direction are partially accommodated.

Such stators are of a complicated design and require an additional space to accommodate the fastening means, which reaches outside the space occupied by the winding. The result is a low space factor of the electrical machine's air gap.

Another stator of an electrical machine (cf. USSR Inventor's Certificate No. 613,447) is known, which comprises a slotted core with slots of a triangle-shaped cross-section, and a multilayer bar winding, wherein the bars of adjacent layers are staggered to adjoin one another on two sides. The bars of the lower layer of the multilayer bar winding are partially received in the slots of the stator core and partially come out into the air gap which accommodates the remaining layers rigidly secured with respect to the lower layer by insulating wedge members interposed between the upper layer of the winding and a cylinder of an insulating material.

The cylinder has to bear all the radial forces, thereby requiring it to be of a considerable thickness. However, this requirement accounts for a reduced space factor of the electrical machine's air gap and effects the performance of the stator as a whole.

Another disadvantage of the stator under review is its inadequate maintainability. Replacement even of a single bar necessitates a removal of the cylinder, which, in turn, makes it necessary to dismantle the whole winding.

SUMMARY OF THE INVENTION

It is an object of the present invention to provide a stator of an electrical machine, featuring improved fastening of the multilayer bar winding, which improves the maintainability of the electrical machine.

It is another object of the invention to provide a stator of an electrical machine, featuring improved fastening of the multilayer bar winding, which improved space factor of the electrical machine's air gap.

It is a further object of the invention to provide a stator of an electrical machine, featuring improved fastening of the multilayer bar winding, which provides a better fastening of the multilayer bar winding of the machine's stator.

The foregoing objects are attained by providing a stator of an electrical machine, comprising a slotted core with slots of a triangle-shaped cross-section, and a multilayer bar winding wherein the bars of adjacent layers are staggered to adjoin one another on two sides. The bars of the lower layer are partially received in the core slots and partially accommodated in the air gap of the electrical machine, which accommodates the remaining layers rigidly fixed with respect to the lower layer by insulating wedge members. Interposed between the bars of the multilayer bar winding are spacers whose slots receive brace members enveloping each of the bars on its opposite sides, the brace members or groups of brace members, extending side by side along the whole length of any bar, facing in opposite directions. Each of the brace members is attached to two rollers. The core is provided with half-closed axial slots, each accommodating a spring clip enveloping one of the rollers; and the second roller is installed in a threaded pin received in a hole provided in each insulating wedge member and secured there, for example, by means of a nut.

It is expedient that the brace members should be constructed as flexible links with stiff ends.

It is preferable that the brace members should comprise a set of elastic steel bands with a high electrical and magnetic resistance.

It is further expedient that each of the spring clips should be provided with a flexible springy projection coming out into the gap between the core of the stator and the bar of the multilayer bar winding and supporting the brace member.

The invention makes it possible to improve the air gap's space factor, which, in turn, accounts for a reduced size and higher efficiency of turbogenerators, increasing it by 10 to 30 percent.

BRIEF DESCRIPTION OF THE ACCOMPANYING DRAWINGS

Other objects and advantages of the present invention will become more apparent from the following detailed description of a preferred embodiment thereof, taken in conjunction with the accompanying drawings, wherein.

DETAILED DESCRIPTION OF THE INVENTION

Figure 1:
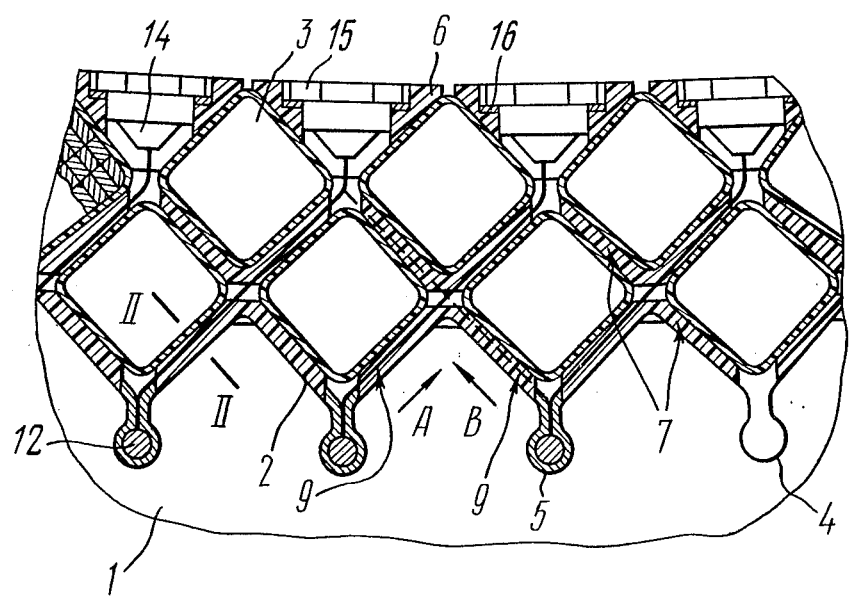
FIG. 1 is a cross-sectional view of a stator of an electrical machine, in accordance with the invention.

Referring to the attached drawings, the stator of an electrical machine comprises a core 1 (FIG. 1) with slots 2 of a triangle shaped cross-section and a bar winding 3 which may be, for example, a two-layer bar winding wherein the bars of adjacent layers are staggered and adjoin one another on two sides. The core 1 is further provided with half-closed axial slots 4, each receiving a spring clip 5. The first layer of bars of the multilayer bar winding 3 is partially received in the slots 2 of the core 1 and partially accommodated in the air gap between the stator and rotor (not shown) of the electrical machine. The slots of the first layer of bars of the multilayer bar winding 3 accommodate the second layer of bars of the multilayer bar winding 3.

The slots of the last layer accommodate insulating wedge members 6 which hold all the layers of the multilayer bar winding 3 in space with respect to the lower layer.

Figure 2:
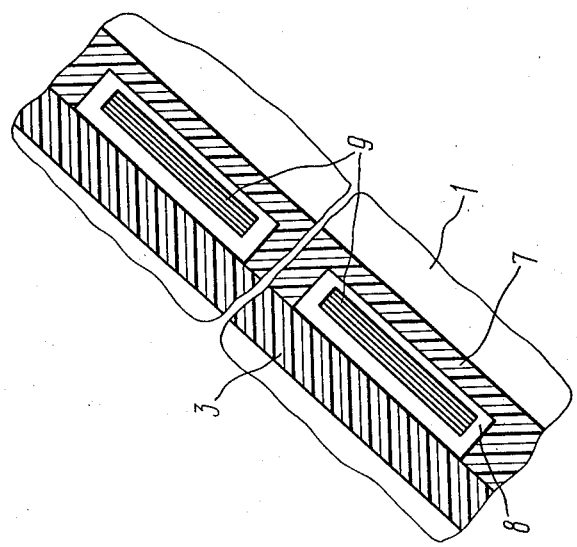
FIG. 2 is a cross-sectional view taken along the line II—II of FIG. 1, showing the way the bracing member is accommodated in the slots of the insulating spacers, according to the invention.

Interposed between the bars of the multilayer bar winding 3 are spacers 7 with slots 8 (FIG. 2) extending longitudinally in several places at an angle to the radii along which extend the bars of the multilayer bar winding 3 (FIG. 1); there are also slot-like gaps 8 accommodating brace members 9 (FIG. 2) which envelop the bars of the multilayer bar winding 3 (FIG. 1) on their opposite sides. The brace members 9, for example those extending side by side along the length of any bar, face in opposite directions so that one of the brace members 9 faces in the direction of arrow A, and the other brace member 9 faces in the direction of the arrow B, or vice versa.

Figure 3:
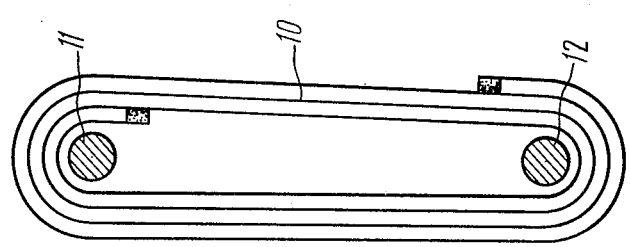
FIG. 3 is a view of a brace member in accordance with the invention.

The brace member 9 may be constructed as a flexible link of a high-strength insulating material, such as glass fiber or glass-fiber cord. The flexible link is to be provided with stiff ends. Brace members of the above type help to reduce the added losses in the stator. It is preferable, however, that the brace members 9 should be made as a set of elastic steel bands 10 (FIG. 3) possessing high electrical and magnetic resistances, keeping in mind that steel band exhibits higher strength characteristics and effectively withstands all radial and tangential forces developing in the multilayer bar winding 3. The ends of the steel band 10 are secured, for example, by means of welding or soldering.

Figure 4:
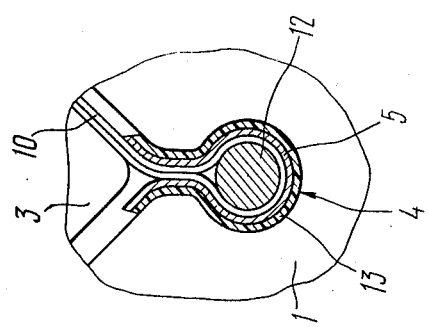
FIG. 4 is a cross-sectional view showing the way part of the bracing member is received in the axial slots of the stator core, in accordance with the invention; p

On one side, the steel band 10 envelops a roller 11, and on the other side, it envelops a roller 12. The roller 12 (FIG. 4) and the steel band 10 are secured inside the spring clip 5 received in the half-closed axial slot 4 of the stator 1 and spaced therefrom by an insulating spacer 13.

The roller 11 (FIG. 5) and the steel band 10 are secured in a threaded pin 14. Each of the threaded pins 14 is installed in a hole provided in the respective insulating wedge member 6. Screwed onto the threaded pin 14 is a nut 15 which rests on the insulating wedge member 6 and is separated therefrom by a thrust washer 16.

The multilayer bar winding 3 (FIG. 1) tends to dry in the course of operation. To compensate for this, the spring clip 5 (FIG. 6) is provided with a flexible springy projection which comes out into the gap between the stator 1 and the bar of the multilayer bar winding 3. Before the nut 15 (FIG. 5) is tightened, the flexible springy projection is in position C (FIG. 6).

The electrical machine stator with slotless fastening of the multilayer bar winding according to the invention is assembled as follows.

The insulating spacers 13 are laid in the axial slots 4 (FIG. 4) of the stator 1. The preassembled brace elements 9 (FIG. 1) are then laid in the same slots 4. Each of the brace members 9 has the spring clip 5 on one of its ends and the threaded pin 14 (FIG. 5) on its opposite end.

The spacers 7 are laid in the slots 2 (FIG. 1) of the stator 1. At the locations of the brace members 9, the spacers 7 are provided with the slots 8 (FIG. 2) to accommodate said brace members 9. The first layer of the multilayer bar winding 3 (FIG. 1) is then laid to be followed by the second layer separated from the first layers by the spacers 7 whose slots accommodate the brace members 9.

The other layers of the multilayer bar winding 3 are laid as described above.

Figure 5:
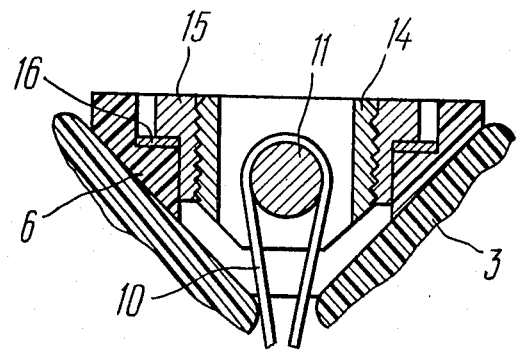
FIG. 5 is a cross-sectional view showing the way the brace member is received in the wedge member, in accordance with the invention.
Figure 6:
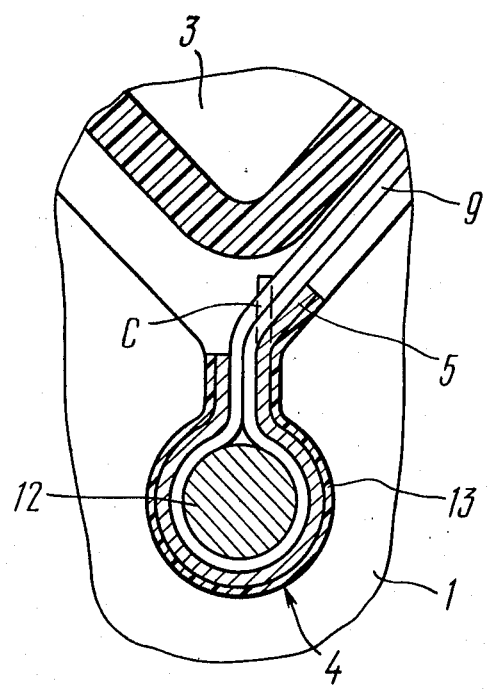
FIG. 6 is a cross-sectional view showing an alternative embodiment of the spring clip of the bracing member, in accordance with the invention.

Upon completing the last layer of the multilayer bar winding 3 of the stator 1, the wedge members 6 are fitted over the threaded pins 14 (FIG. 5). Each of the wedge members 6 is provided with a hole at the location of the brace member 9.

The brace members 9 are fastened by the nuts 15 screwed onto the threaded pins 14, the nuts 15 being firmly held in place by the thrust washers 16.

The fastening is done as described above for windings of three and more layers.

The brace members 9 (FIG. 1) and the insulating wedge members 6 are found inside the space occupied by the multilayer bar winding 3; as a result, the space factor of the air gap is increased by about 20 percent.

While the electrical machine is in operation, the tangential force is transmitted from the multilayer bar winding 3 through the walls of the slots 2 to the core 1 of the stator. The radial force is produced by screwing the nuts 15 (FIG. 5) onto the threaded pins 14. The insulating wedge members 6 (FIG. 1) exert pressure on the sides of the bars of the upper layer of the multilayer bar winding 3 which, in turn, presses the lower layer of the bars against the walls of the slots 2 of the stator 1. Thus a monolithic system is produced which effectively withstands both radial and tangential forces, whereby the fastening of the multilayer bar winding 3 of the stator 1 is made more reliable.

Whenever it is necessary to replace a bar of the multilayer bar winding 3 of the stator 1, it is sufficient to remove two adjacent insulating wedge members 6 without dismantling the entire multilayer bar winding 3.

Thus the invention improves the maintainability of the electric machine, making it as easy to maintain as any conventional slotted machine. The invention further improves the space factor of the machine's air gap and provides for a better fastening of the multilayer bar winding of the machine's stator.

What is claimed is:

1. A stator of an electrical machine, separated by an air gap from a rotor, comprising:
   a core of said stator having slots of a triangular cross-section and half-closed axial slots;
   a multilayer bar winding, bars of adjacent layers being staggered and adjoining one another on two sides, bars of a first layer being partially received in said slots of said stator and partially received in said air gap, and bars of remaining layers being accomodated in said air gap;
   insulating wedge members having holes and being accomodated in slots of bars of a last layer of said multilayer bar winding to hold all of said layers in place;
   spacers having slots interposed between said bars of said multilayer bar winding;
   first rollers accomodated in respective half-closed slots of said stator;
   second rollers accomodated in said holes of respective insulating wedge members; and
   brace members accomodated in said slots of respective spacers and enveloping respective bars of said multilayer bar winding, a first end of each brace member enveloping a respective first roller, and a second end of each brace member enveloping a respective second roller.

2. A stator of an electrical machine as claimed in claim 1, wherein said brace members are constructed as flexible links with stiff ends.

3. A stator of an electrical machine as claimed in claim 1, wherein said brace members comprise a set of elastic steel bands possessing high electrical and magnetic resistances.

4. A stator of an electrical machine as claimed in claim 1, further comprising:
spring clips enveloping respective first rollers and being accomodated in respective half-closed axial slots of said stator; and
threaded pins accomodated in said hole of a respective insulating wedge member and in which a respective second roller is accomodated.

5. A stator of an electrical machine as claimed in claim 4, wherein each spring clip includes a flexible springy projection extending into a gap between said core of said stator and a respective bar of said multilayer bar winding.

6. A stator of an electrical machine as claimed in either of claims 4 or 5, wherein said brace members are constructed as flexible links with stiff ends.

7. A stator of an electrical machine as claimed in either of claims 4 or 5, wherein said brace members comprise a set of elastic steel bands possessing high electrical and magnetic resistances.

* * * * *